United States Patent
Erekson

(12) 
(10) Patent No.: US 6,622,018 B1
(45) Date of Patent: Sep. 16, 2003

(54) PORTABLE DEVICE CONTROL CONSOLE WITH WIRELESS CONNECTION

(75) Inventor: Rich Erekson, Ogden, UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/558,413

(22) Filed: Apr. 24, 2000

(51) Int. Cl.[7] .................................................. H04M 3/00
(52) U.S. Cl. ...................................... 455/420; 455/419
(58) Field of Search ................................. 455/420, 456, 455/457, 445, 404, 75, 566, 575, 96, 99, 145; 342/457.1; 340/825.36, 825.37, 825.49

(56) References Cited

U.S. PATENT DOCUMENTS 5,917,405 A * 6/1999 Joao ............................ 340/426
6,091,957 A * 7/2000 Larkins et al. ............... 455/456
6,161,066 A * 12/2000 Wright et al. .................. 701/36
6,339,706 B1 * 1/2002 Tillgren et al. .............. 455/419

* cited by examiner

Primary Examiner—William Trost
Assistant Examiner—Naghmeh Mehrpour
(74) Attorney, Agent, or Firm—Wagner, Murabito & Hao LLP

(57) ABSTRACT

A system and method for controlling a remote device over a wireless connection. In one embodiment, a hand-held computer system having a Bluetooth-enabled transceiver is used to control other Bluetooth-enabled devices. A wireless connection between a transceiver and a remote device is established. A position where a stylus makes contact with a surface of an input device of the hand-held computer system is registered. The particular position where the stylus element makes contact with the input device is translated into a particular command for controlling the remote device. The command is then transmitted to the remote device over the wireless connection.

27 Claims, 12 Drawing Sheets

PORTABLE DEVICE CONTROL CONSOLE WITH WIRELESS CONNECTION

TECHNICAL FIELD

The present invention relates to systems and devices connected using wireless links, such as systems and devices that use the Bluetooth technology. In particular, the present invention pertains to a method and system for controlling remote devices over a wireless connection.

BACKGROUND ART

Consider, for example, the number of devices and appliances in the typical living room or family room of a residential dwelling: lamps, light switches, a thermostat, and consumer electronic devices such as televisions, video cassette recorders, and stereos, some of these devices themselves comprising multiple devices such as compact disk players, tape players, etc. Each of these devices requires manual interaction by a user in order to turn them off or on, to raise or lower levels, and so on. Other rooms of the house, as well as factories and places of business, also have countless devices and appliances that require manual interaction in order to use and control them.

Of course, many of these devices are or can be remotely controlled. In the home, for example, remote control devices for televisions, stereos and the like are very common. Devices for controlling lights, etc., are also available although generally not as commonly used.

Remote control devices in each of their present forms have a number of associated shortcomings. For example, a separate remote control device may be required for each device to be controlled. In some instances the separate remotes can be replaced with a universal remote control; however, universal remotes still have their shortcomings. Generally, current universal remotes often do not have the resources (e.g., memory and computational logic) to allow them to be used with all devices, or they may not be capable of controlling a new device. In addition, in order to accommodate the variety of devices to be controlled, universal remotes usually have a multiplicity of buttons and thus can be difficult to use.

Another shortcoming associated with current remote control devices is their limited range. Commonly, remote control devices use infrared beams to communicate commands to the device that is to be controlled, and so the remotes can only be used for line-of-sight applications. Devices behind an object, around a corner, or in another room cannot be controlled if they are not in the line of sight of an infrared remote.

A more modern solution is to wire devices together into a network of some sort, so that they can be controlled from a central location such as a personal computer. However, this approach also has a number of shortcomings. For example, the connections and cabling needed may be quite cumbersome and complex. In addition, this approach is difficult and expensive to backfit into existing homes and businesses. Furthermore, such an approach is not necessarily convenient. For instance, the central computer system is not a practical or convenient replacement for a television remote, nor is it portable enough to allow it to be easily moved from one room to another whenever it is necessary to do so.

Accordingly, a need exists for a device and/or method that can be used to remotely control a variety of different devices and appliances, including new devices. A need also exists for a device and/or method that can satisfy the above need, that is relatively simple to introduce into existing homes and businesses, and that is user-friendly. In addition, a need exists for a device and/or method that satisfies the above needs, is portable, and is not limited to line-of-sight applications.

DISCLOSURE OF THE INVENTION

The present invention provides a system and method that can be used to remotely control a variety of different devices, including new devices. The present invention also provides a system and method that is relatively easy to introduce into existing homes and businesses and that is user-friendly. In addition, the present invention provides a system and method that is portable and that is not limited to line-of-sight applications.

In the present embodiment, the present invention pertains to a system and method for controlling remote devices over a wireless connection (e.g., using a radio signal). In one embodiment, a portable computer system (e.g., a palmtop or hand-held computer) having a transceiver is used to control compliant devices. In a preferred embodiment, the transceiver and the remote devices are Bluetooth-enabled devices.

In the present embodiment of the present invention, a wireless connection between the portable computer system and one or more remote devices is established. Each of the remote devices is manifested on a display device of the portable computer system, and one of the devices is selected using, for example, a stylus element.

In one embodiment, the stylus element can also be used to specify commands for controlling the remote device. A position where the stylus element makes contact with a surface of the display device of the portable computer system is registered. The particular position where the stylus element makes contact with the display device is translated into a particular command for controlling the remote device. The command is then transmitted to the remote device over the wireless connection.

In one embodiment, a rendering of the remote device or of a mechanism that can be used to control the remote device is displayed on the display device. The contact of the stylus element with a position in the rendering is translated into a particular command for controlling the remote device. In another embodiment, a menu of commands for controlling the remote device is displayed on the display device. The contact of the stylus element with a position in the menu is translated into a particular command for controlling the remote device.

In yet another embodiment, the movement of the stylus element over the surface of an input device is recognized and translated into a particular command for controlling the remote device. In another embodiment, by moving the stylus element over the surface of the input device, motion is imparted to the rendering on the display device of the remote device or the mechanism for controlling the remote device.

The present invention thus provides a system (e.g., a Bluetooth-enabled device, specifically a portable computer system) that can be used to remotely control compliant devices (e.g., other Bluetooth-enabled devices) over a wireless (radio) connection. With a radio connection, the system of the present invention is not limited to line-of-sight applications. Remote devices can be adapted to receive commands over the wireless connection, obviating the need for hardwire connections and making the system relatively easy to implement in homes and businesses. The processing power and other features of the portable computer system enable user-friendly interfaces, and also allow a variety of remote devices to be controlled, including new devices introduced into the home or business.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
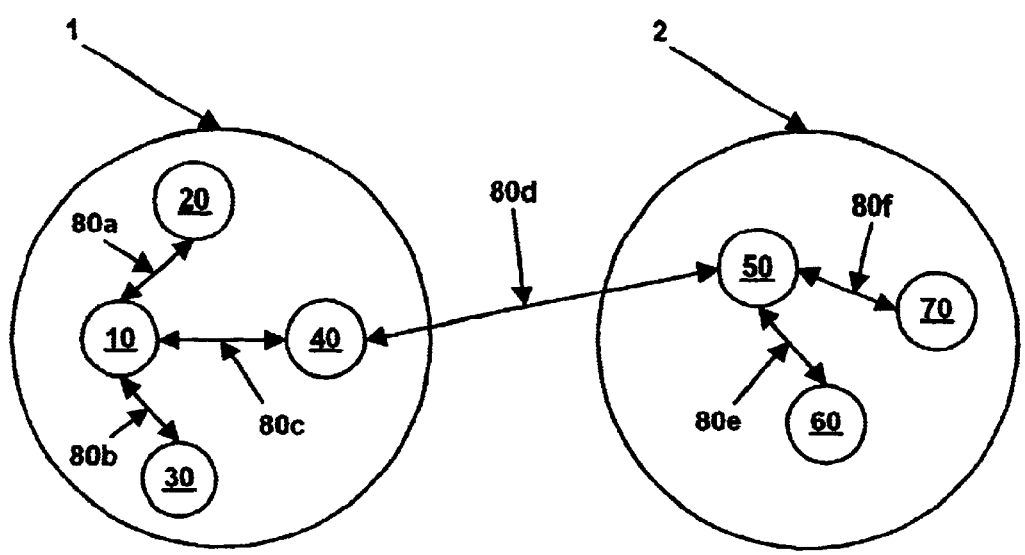
FIG. 1 illustrates one embodiment of a network of devices coupled using wireless connections in accordance with the present invention.

Reference, will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "establishing," "registering," "recognizing," "broadcasting," "receiving," "manifesting," "transmitting," "displaying," or the like, refer to the action and processes (e.g., process 1100 FIG. 11) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices and appliances. However, it is appreciated that the present invention may be utilized with devices and systems compliant with standards different from Bluetooth, such as the IEEE (Institute of Electronic and Electrical Engineering) 802.11 standard.

The Bluetooth technology allows cables that connect one device to another to be replaced with short-range radio links. Bluetooth is targeted at mobile and business users who need to establish a link, or small network, between their computer, cellular phone and other peripherals. The required and nominal range of Bluetooth is thus set to approximately ten (10) meters. To support other uses, for example the home environment, Bluetooth can be augmented to extend the range to up to 100 meters.

The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone.

Bluetooth radio technology can also provide: a universal bridge to existing data networks, a peripheral interface, and a mechanism to form small private ad hoc groupings of connected devices away from fixed network infrastructures.

FIG. 1 illustrates the topology of a network of devices coupled using wireless connections in accordance with one embodiment of the present invention. In the parlance of Bluetooth, a collection of devices connected in a Bluetooth system are referred to as a "piconet" or a "subnet." In the present embodiment, a piconet starts with two connected devices, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80a–c. Similarly, devices 50, 60 and 70 are coupled in piconet 2 using wireless connections 80e–f. Piconet 1 and piconet 2 are coupled using wireless connection 80d. Devices 10–70 can be printers, personal digital assistants (PDAs), desktop computer systems, laptop computer systems, cell phones, fax machines, keyboards, and joysticks equipped with a Bluetooth radio transceiver or adapted to communicate with Bluetooth devices ("Bluetooth-enabled"). In accordance with the present invention, devices 10–70 can also be virtually any type of device, including mechanical devices and appliances, equipped with a Bluetooth radio transceiver or Bluetooth-enabled. The Bluetooth radio transceiver may be integrated into the device, or it may be coupled to the device.

Figure 2:
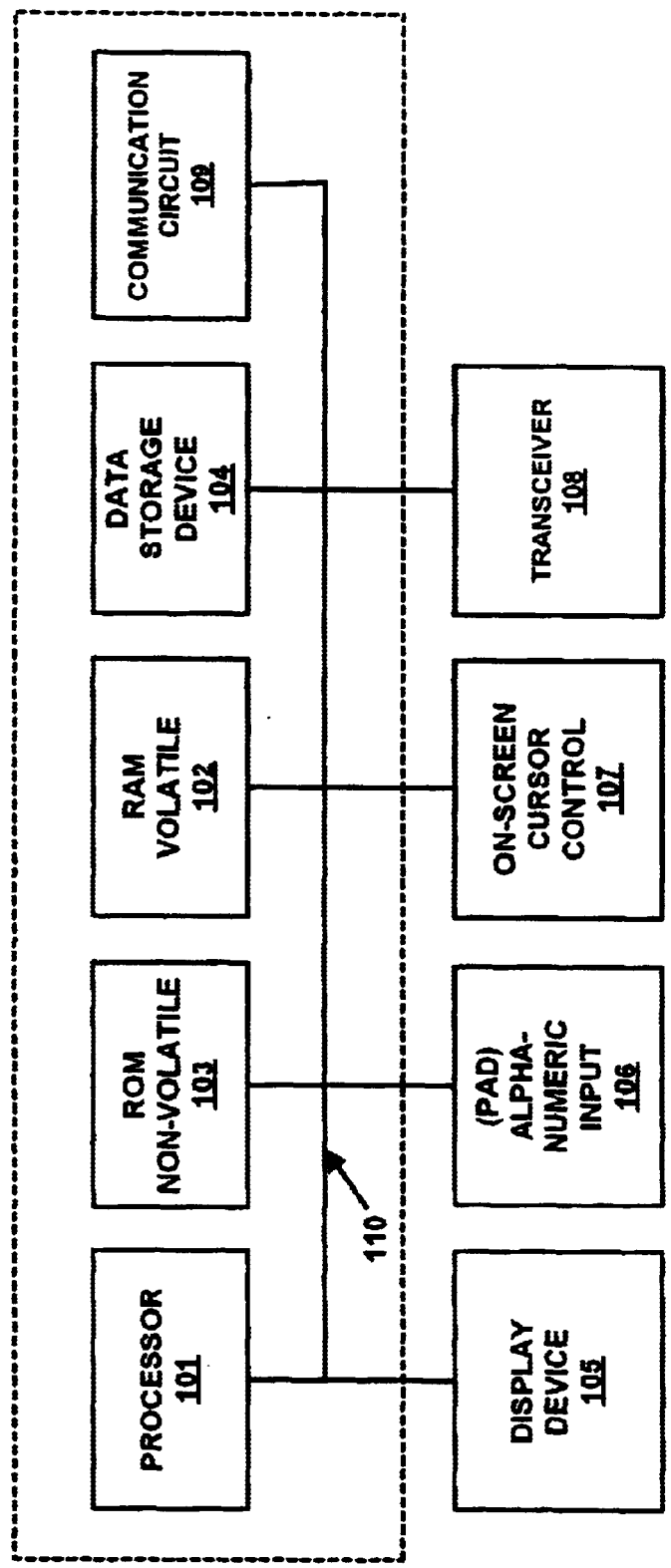
FIG. 2 is a block diagram of one embodiment of a portable computer system in accordance with the present invention.

FIG. 2 is a block diagram of a portable computer system 100 (e.g., a PDA, a hand-held computer system, or palmtop computer system) upon which embodiments of the present invention can be implemented. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Data storage device 104 can be removable.

Computer system 100 also contains a display device 105 coupled to the bus 110 for displaying information to the computer user. The display device 105 utilized with computer system 100 may be a liquid crystal display device, a cathode ray tube,(CRT), a field emission display device (also called a flat panel CRT) or other display device suitable for generating graphic images and alphanumeric characters recognizable to the user. In the preferred embodiment, display device 105 is a flat panel display.

Computer system 100 also includes a cursor control or directing device (on-screen cursor control 107) coupled to bus 110 for communicating user input information and command selections to processor 101. In one implementation, on-screen cursor control device 107 is a touch-screen device incorporated with display device 105. On-screen cursor control device 107 is capable of registering a position on display device 105 where a stylus makes contact.

In accordance with the present invention, a stylus can be used to select a command for controlling a remote device by touching the stylus to display device 105. In one embodiment, a command can be selected from a menu of commands displayed on display device 105. In another embodiment, a rendering of the remote device or of a mechanism for controlling the remote device may be manifested on display device 105, and a command can be selected by touching the stylus to a prescribed location in the rendering. The position where the stylus contacts display device 105 is registered and fed to processor 101, which translates this information into a command for controlling the remote device. The command is then transmitted to the remote device over a wireless connection using signal transmitter/receiver device ("transceiver") 108.

Also included in computer system 100 of FIG. 2 is an input device 106 that in one implementation is a stroke or character recognition pad (e.g., a "digitizer"). Input device 106 can communicate information and command selections to processor 101. Input device 106 is capable of registering a position where a stylus (or an element having the functionality of a stylus) makes contact. Input device 106 also has the capability of registering movements of a stylus (or an element having the functionality of a stylus) across or above the surface of input device 106.

In accordance with the present invention, in one embodiment, a stylus can be used for making a stroke or inscribing a character on the surface of input device 106. The stroke or character information is then fed to a processor 101 for automatic character recognition. Once the stroke or character information is recognized, it can be displayed on display device 105 for verification and/or modification.

In accordance with the present invention, stroke information entered onto input device 106 can correspond to a command that can be used to control a remote device. That is, particular strokes or characters can correspond to a respective command. A stroke or character is recognized by processor 101 and translated by processor 101 into a command for controlling a remote device. The command is then transmitted to the remote device over a wireless connection using transceiver 108.

With reference still to FIG. 2, transceiver 108 is coupled to bus 110 and enables computer system 100 to communicate wirelessly with other electronic devices coupled in a piconet or scatternet (refer to FIG. 1). It should be appreciated that within the present embodiment, transceiver 108 is coupled to an antenna and provides the functionality to transmit and receive information over a wireless communication interface. In one embodiment, transceiver 108 is a Bluetooth device. Additional information with regard to the Bluetooth embodiment is provided in conjunction with FIGS. 4A and 4B.

Figure 3:
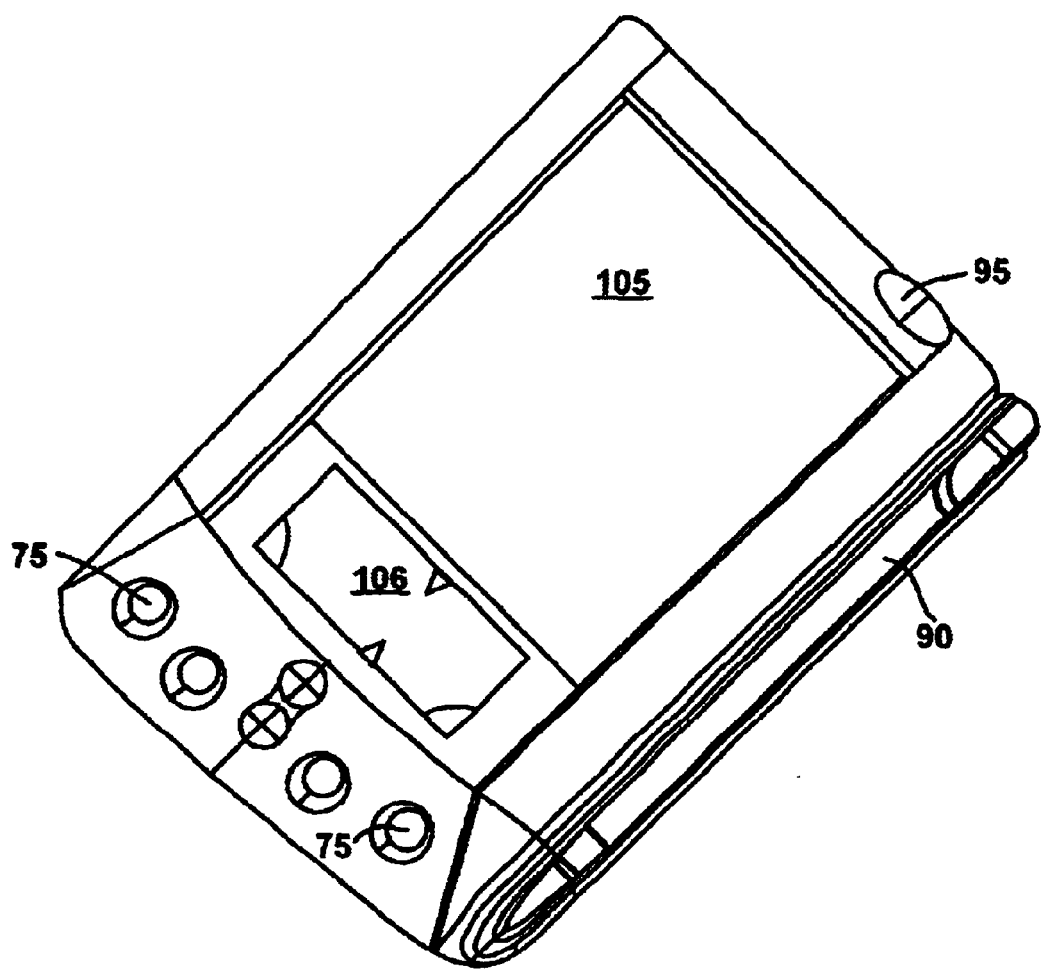
FIG. 3 is a top-side perspective view of a portable computer system in accordance with one embodiment of the present invention.

FIG. 3 is a perspective illustration of the top-side face 100a of one embodiment of the portable computer system 100 (FIG. 2) in accordance with the present invention. The top-side face 100a contains one or more dedicated and/or programmable buttons 75 for selecting information and causing the computer system to implement functions. The on/off button 95 is also shown.

In the present embodiment, the top-side face 100a contains a display device 105 typically surrounded by a bezel or cover. A removable stylus element 90 is also shown. The display device 105 is a touch screen capable of registering contact between the screen and the tip of the stylus element 90. The top-side face 100*a* also contains an input device 106 that in one implementation is a stroke or character recognition pad. Input device 106 is a touch screen type of device capable of registering contact with a tip of stylus element 90, and also can register movements of the stylus element. The stylus element 90 can be of any shape and material to make contact with the display device 105 and input device 106.

Figure 4A:
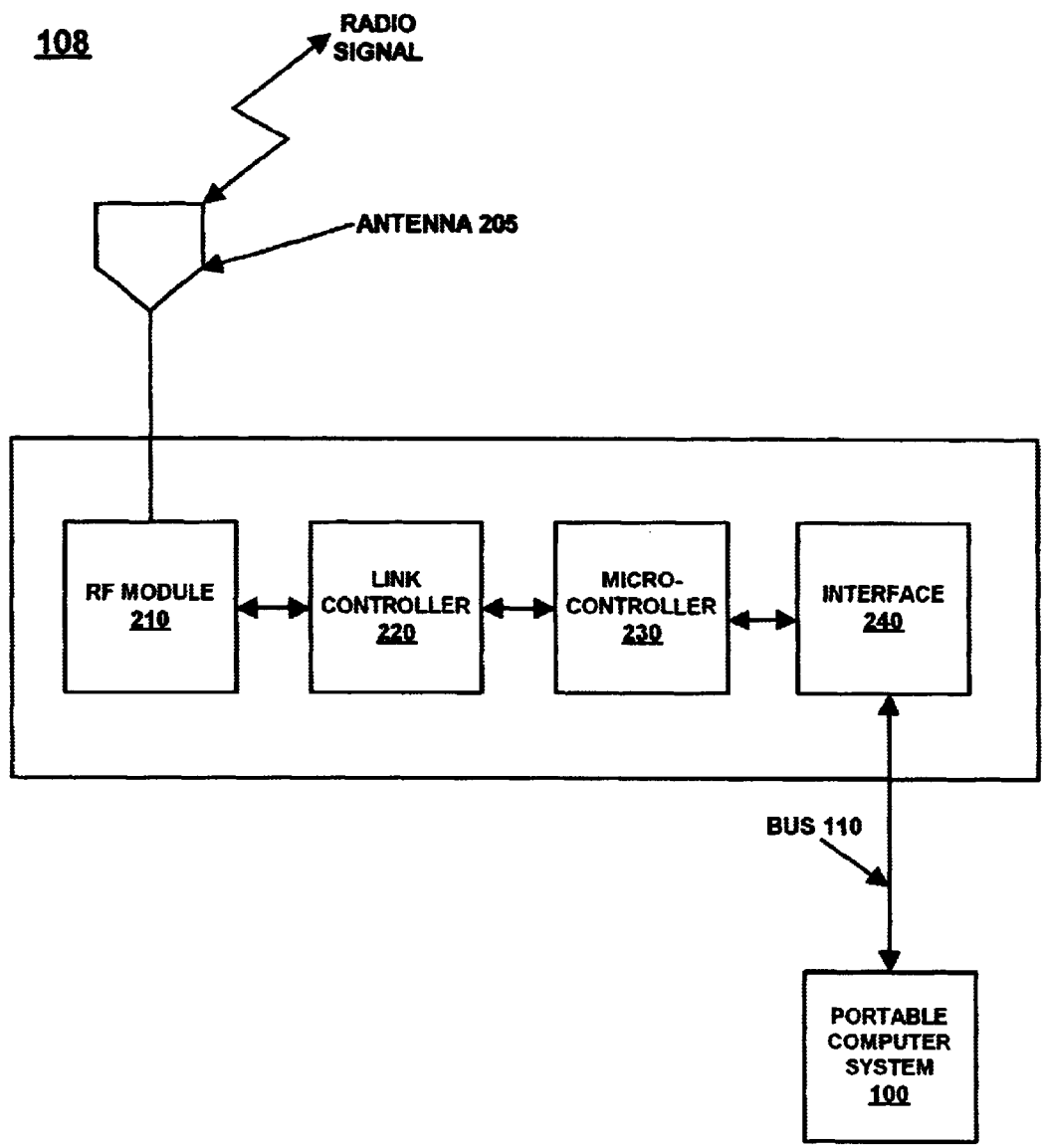
FIGS. 4A and 4B are block diagrams showing one embodiment of a wireless transceiver coupled to, respectively, a portable computer system and an external device in accordance with the present invention.
Figure 4B:
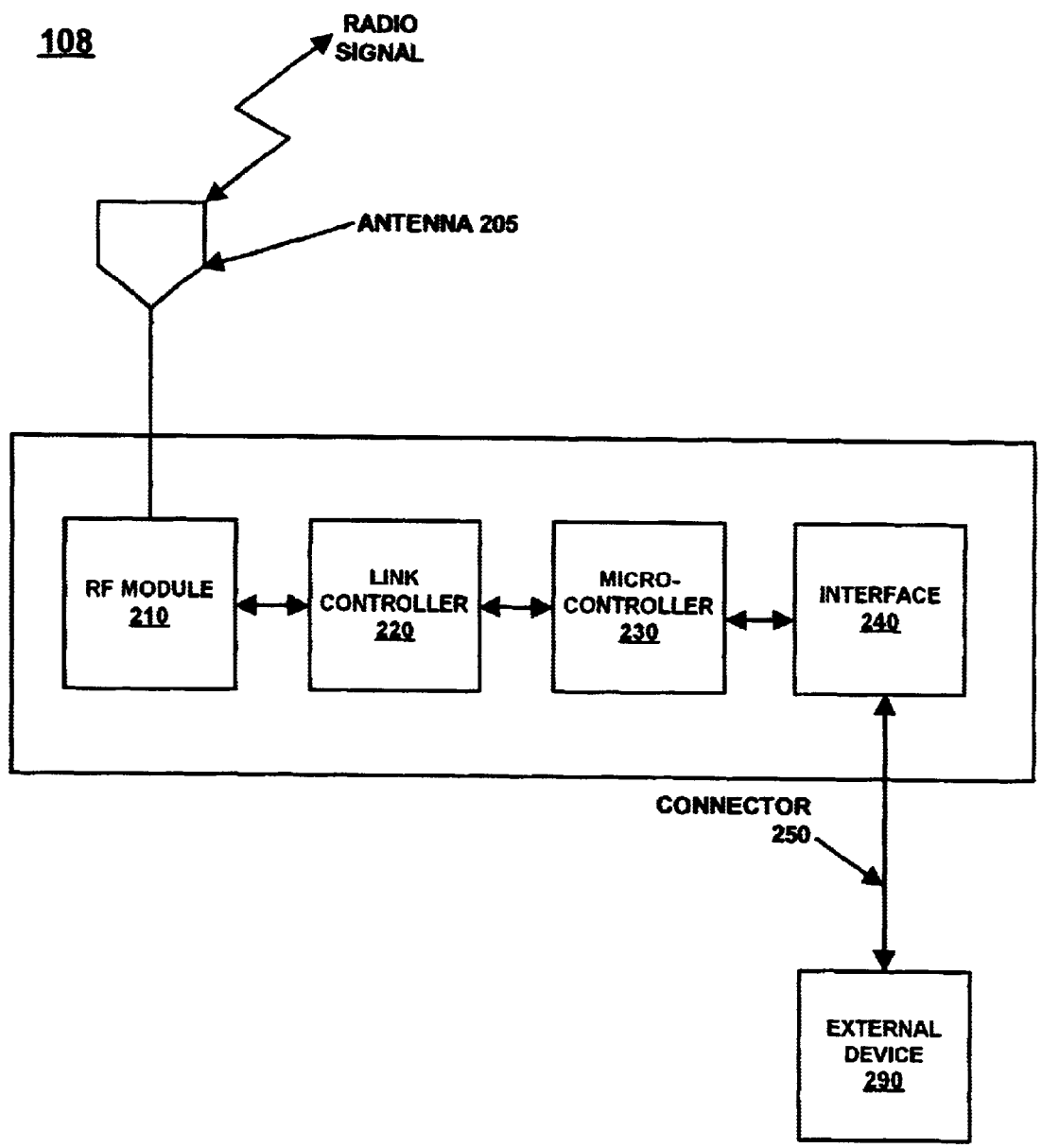

FIGS. 4A and 4B are block diagrams of one embodiment of a transceiver 108 in accordance with the present invention. In a preferred embodiment (the "Bluetooth embodiment", transceiver 108 is a Bluetooth device comprising a digital component (e.g., a Bluetooth controller) and an analog component (e.g., a Bluetooth radio). In accordance with the present invention, a transceiver 108 is coupled via a system bus 110 to a system or device that will be used to control remote devices (e.g., portable computer system 100 of FIG. 2). Similarly, a transceiver 108 is coupled via a connector 250 to each remote device that is to be controlled (e.g., external device 290).

With reference to both FIGS. 4A and 4B, in the present embodiment, transceiver 108 comprises an antenna 205 for receiving or transmitting radio signals, a radio frequency (RF) module 210, a link controller 220, a microcontroller (or central processing unit) 230, and an external interface 240.

In the Bluetooth embodiment, RF module 210 is a Bluetooth radio. Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE 802.11 standard. The frequency hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108 in "sniff" mode, "hold" mode, "park" mode or "standby" mode (refer to FIG. 5 below).

With reference still to FIGS. 4A and 4B, in the present embodiment, interface 240 is for coupling transceiver 108 to portable computer system 100 or to external device 290 in a suitable format (e.g., USB, PCMCIA, PCI, CardBus, PC Card, etc.). In the present embodiment, interface 240 runs software that allows transceiver 108 to interface with portable computer system 100 or external device 290.

Figure 5:
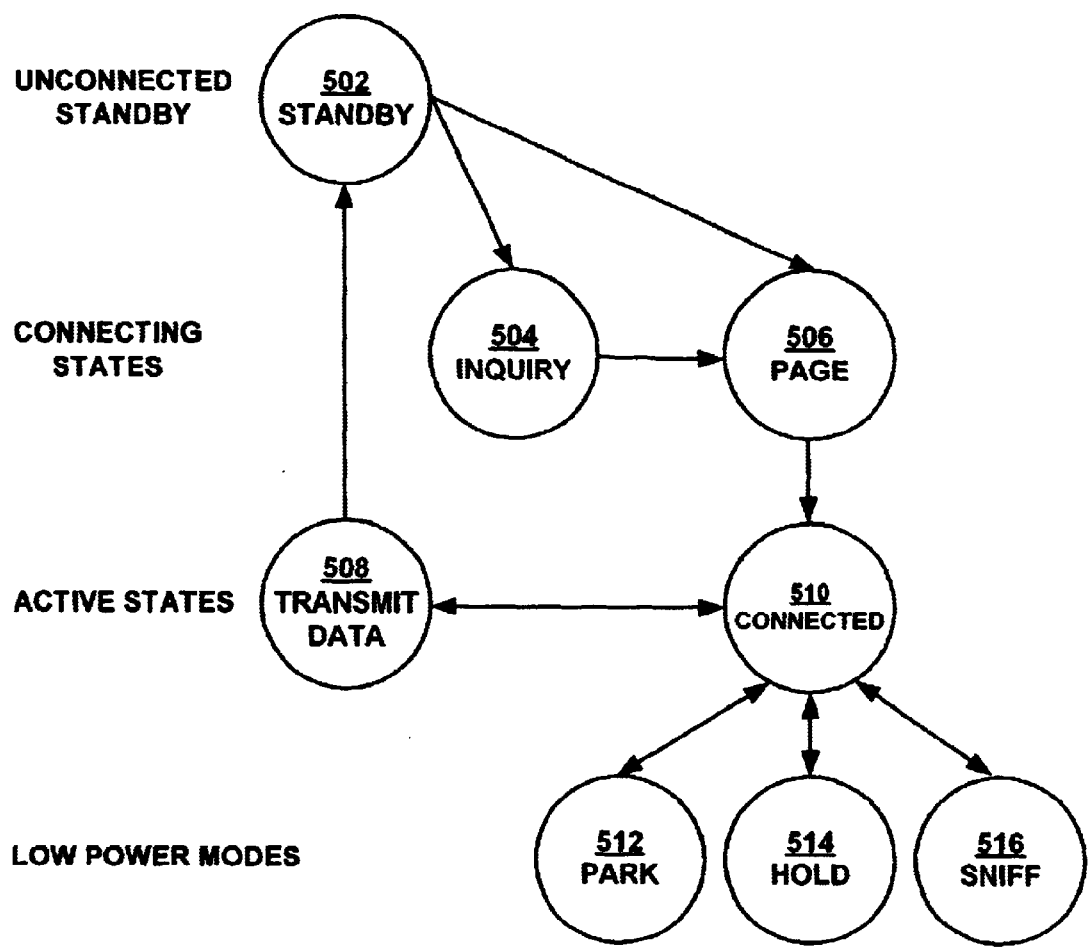
FIG. 5 illustrates the different operating modes of a wireless transceiver in accordance with one embodiment of the present invention.

FIG. 5 illustrates the different operating modes of a wireless transceiver 108 (FIGS. 4A and 4B) in accordance with one embodiment of the present invention. In the Bluetooth embodiment, before any connections between Bluetooth devices are created, all devices are in standby mode (502). In this mode, an unconnected unit "listens" for messages at a regular rate (e.g., every 1.28 seconds) on a set of hop frequencies defined for that unit. The hold mode (514) is a power saving mode that can be used for connected units if no data need to be transmitted. The sniff mode (516) and park mode (512) are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message (506) if the address is already known, or by an "inquiry" message (504) followed by a subsequent page message if the address is unknown. When connected (510), data can be transmitted (508) between devices.

Figure 6:
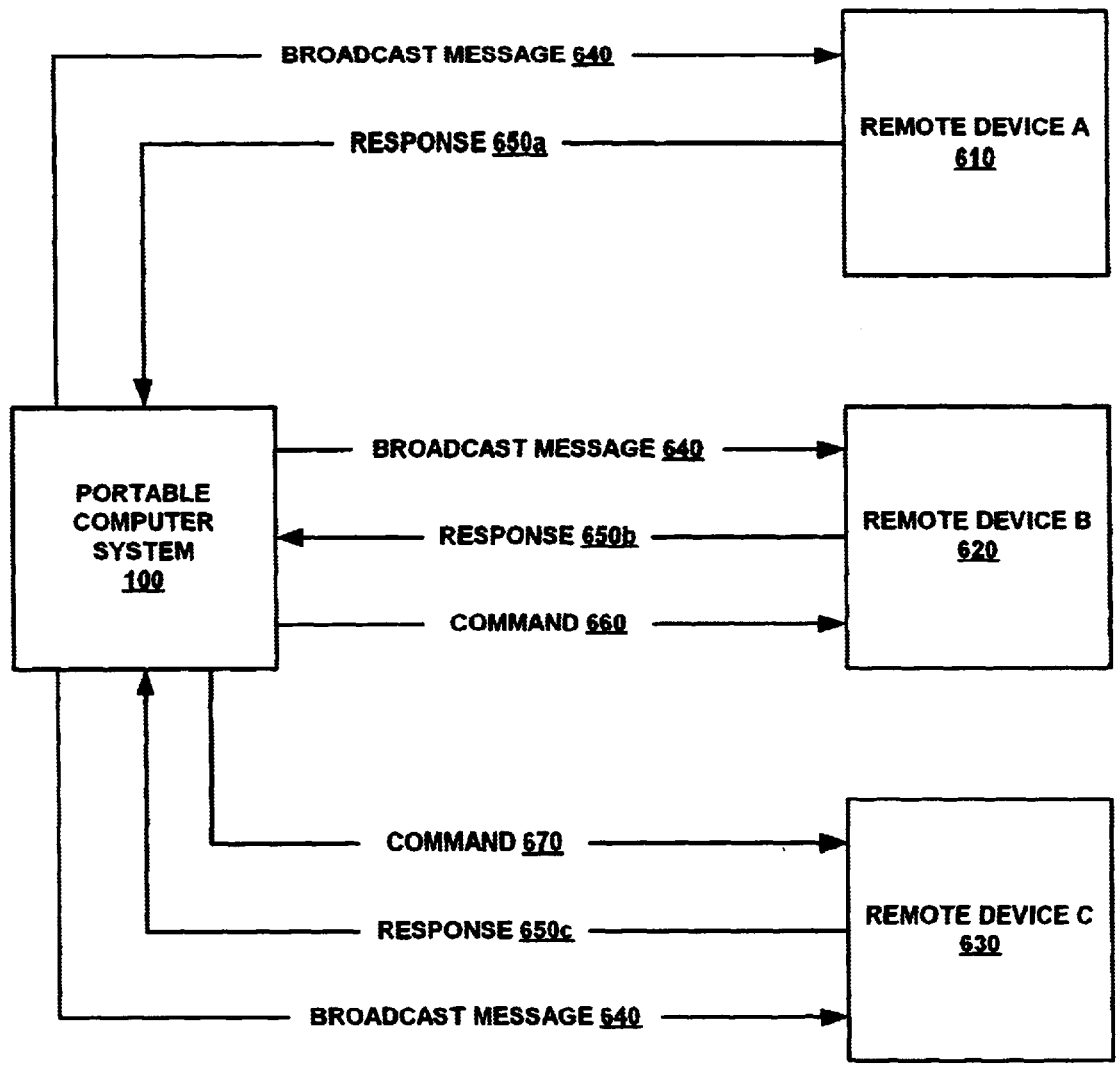
FIG. 6 illustrates the flow of messages between a controlling device and remote devices in accordance with one embodiment of the present invention.

FIG. 6 illustrates the flow of messages between a controlling device (e.g., portable computer system 100) and remote devices to be controlled (610, 620 and 630) in accordance with the present embodiment of the present invention. In one embodiment, portable computer system 100 and remote devices 610–630 are Bluetooth devices or Bluetooth-enabled devices.

In the present embodiment, when it is necessary to locate and identify compliant devices, portable computer system transmits a broadcast message 640 (e.g., an inquiry 504) that is received by compliant remote devices 610–630. For example, a user with portable computer system 100 enters a room containing remote devices 610–630. Portable computer system 100, either automatically or in response to a user input, transmits broadcast message 640 for the purpose of discovering compliant devices in the room.

As compliant devices, remote devices 610–630 respond to broadcast message 640 via responses 650*a*, 650*b* and 650*c*, respectively. In the present embodiment, responses 650*a*–*c* include the Medium Access Control (MAC) address for remote devices 610–630. Typically, each remote device is assigned a temporary MAC address for the duration of the connection. All communications between portable computer system 100 and a remote device carry the MAC address of the remote device. Responses 650*a*–*c* can also include information characterizing, for example, the type and capabilities of each remote device. This information may include an identifier that can be used by portable computer system 100 to characterize the remote device based on information stored in a database or lookup table.

Portable computer system 100 can then transmit a command 660 to a selected remote device (e.g., remote device B 620). Command 660 is a command for controlling the remote device in some prescribed manner (e.g., turning the device off or on, raising or lowering a level, etc.) based on the type of device and its capabilities. In accordance with the present invention, a second device can be selected (e.g., remote device C 630), and a command 670 can be transmitted to that device.

In the present embodiment, when a connection between portable computer system 100 and a remote device has already been established, or when the MAC address of the remote device is known, broadcast message 640 is a page 506 (FIG. 5) instead of an inquiry 504.

Figure 7:
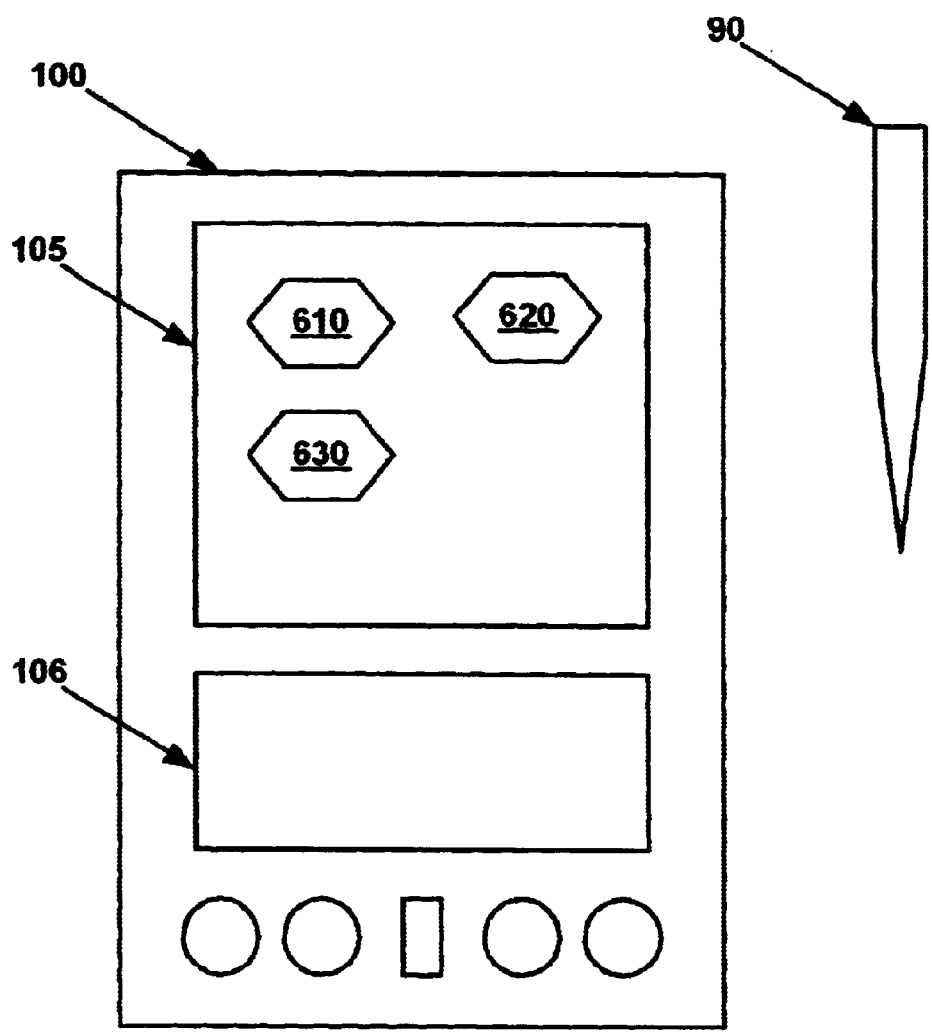
FIG. 7 illustrates one embodiment of a display used on a controlling device in accordance with the present invention.

FIG. 7 illustrates one embodiment of a display used on a controlling device (e.g., portable computer system 100) in accordance with the present invention. As described above, portable computer system 100 includes a display device 105, an input device 106, and a stylus element 90.

In this embodiment, with reference also to FIG. 6, each of the remote devices 610–630 have sent a response 650a–c, respectively, to portable computer system 100 in response to broadcast message 640. Accordingly, each of remote devices 610–630 are indicated on display device 105. For example, an icon can be used to represent each remote device, each remote device can be identified by its name in a menu, etc. It is appreciated that other mechanisms may be used to indicate a remote device on display device 105 in accordance with present invention.

In the present embodiment, a user can then select one of the remote devices by touching stylus element 90 to display device 105. It is appreciated that an element other than stylus element 90 can be used to make a selection, or that another mechanism may be used to make a selection. For example, the user may simply touch the screen, or an on-screen cursor of some type may be used.

Figure 8:
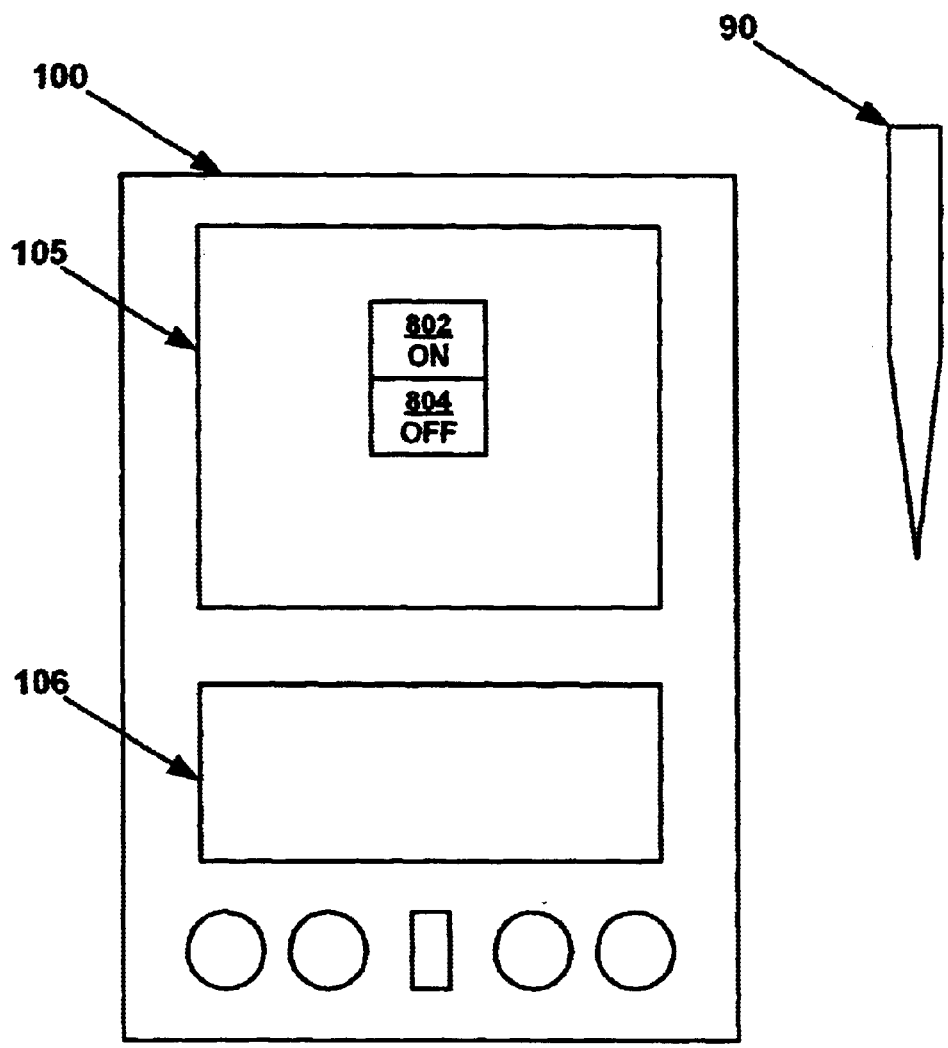
FIG. 8 illustrates another embodiment of a display used on a controlling device in accordance with the present invention.

FIG. 8 illustrates another embodiment of a display used on a controlling device (e.g., portable computer system 100) in accordance with the present invention. In this embodiment, a connection has been established between the controlling device and the device to be controlled, and the characteristics otfthe device to be controlled have been identified. In this embodiment, display device 105 displays a rendering of a mechanism that can be used to control the remote device, such as an on/off switch. In the present embodiment, a user can turn the remote device on by touching stylus element 90 to position 802 in the rendering, and can turn the remote device off by touching stylus element 90 to position 804. However, it is appreciated that an element other than stylus element 90 can be used to make a selection, or that another mechanism may be used to make a selection.

In one embodiment, a user can also control the remote device using input device 106. As described above, input device 106 is adapted to recognize movements of stylus 90 on or above the surface of input device 106, and to translate particular movements into particular commands. Thus, for example, a user might turn on the remote device by writing the word "on" using input device 106. Alternatively, a user might instead write a character that represents the command "on" in some type of shortened version, or might make a stroke that represents this command. It is appreciated that other mechanisms, styles, and methods can be used to input a command using input device 106 in accordance with the present invention.

Figure 9:
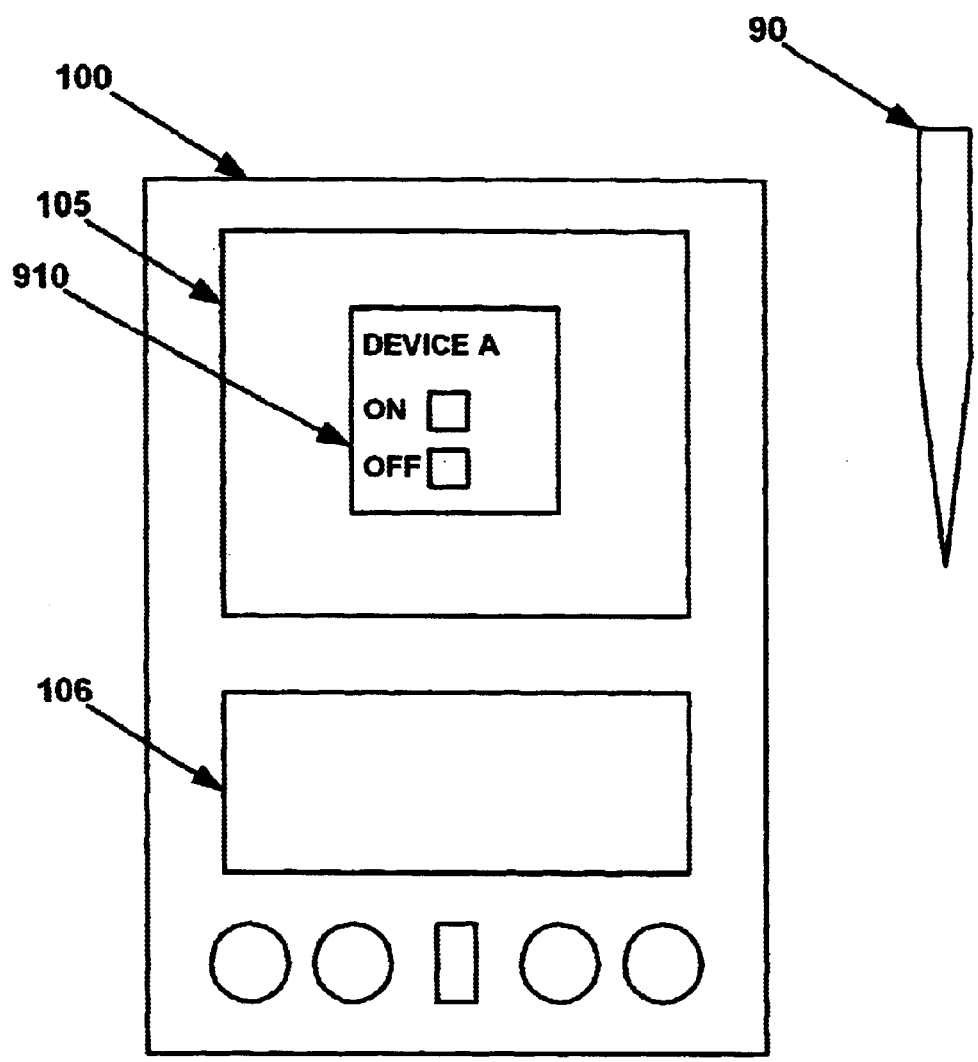
FIG. 9 illustrates another embodiment of a display used on a controlling device in accordance with the present invention.

FIG. 9 illustrates another embodiment of a display used on a controlling device (e.g., portable computer system 100) in accordance with the present invention. In this embodiment, a connection has been established between the controlling device and the device to be controlled, and the characteristics of the device to be controlled have been identified. In this embodiment, display device 105 displays a menu 910 of commands for the remote device, such as an "on" command and an "off" command. In the present embodiment, a user can turn the remote device on by touching stylus element 90 to a particular position in the menu 910. It is appreciated that an element other than stylus element 90 can be used to make a selection, or that another mechanism may be used to make a selection.

Figure 10:
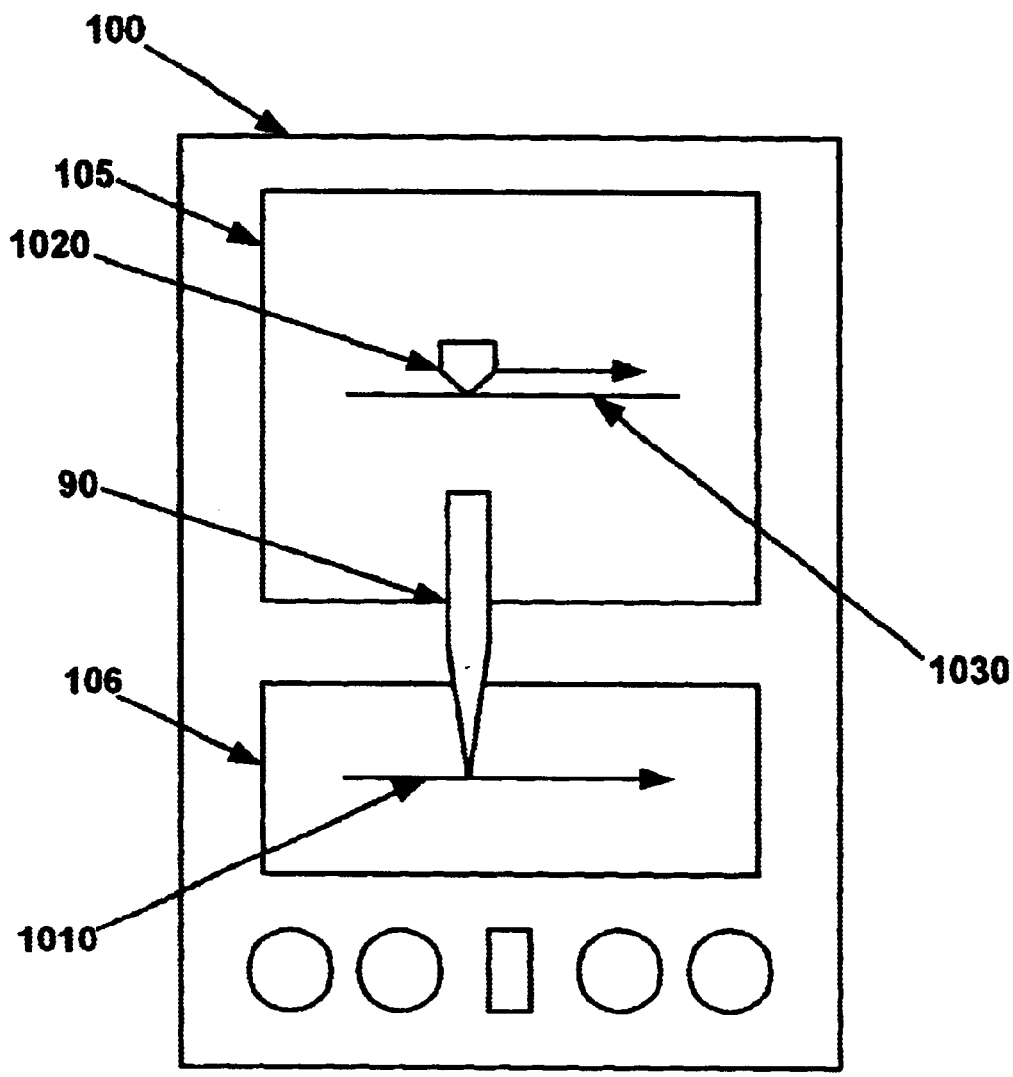
FIG. 10 illustrates a display on a controlling device responding to movement on an input device in accordance with one embodiment of the present invention.

FIG. 10 illustrates a display on a controlling device (e.g., portable computer system 100) responding to movement on an input device 106 in accordance with one embodiment of the present invention. In this embodiment, a connection has been established between the controlling device and the device to be controlled, and the characteristics of the device to be controlled have been identified. In this embodiment, for example, a variable level of the remote device is to be controlled (e.g., a level of brightness if the remote device is a light).

In the present embodiment, the level to be controlled is indicated by an indicator 1020 displayed on display device 105. A user touches stylus element 90 to input device 106, and moves the stylus as indicated by stroke 1010. In response to the.motion of the stylus across input device 106, indicator 1020 moves in a corresponding manner along the path 1030. That is, motion is imparted to indicator 1020 by moving stylus element 90 on input device 106. It is appreciated that an element other than stylus element 90, or another type of mechanism, can be used with input device 106.

It is appreciated that, in accordance with the present invention, different mechanisms for controlling the remote device can be rendered on display device 105, different types of movement can be used with input device 106, and different types of motion can be imparted to the rendering on display device 105 in response to the movements on input device 106. In accordance with the present embodiment of the present invention, either the motion of the stylus itself or the corresponding motion of the rendering can be translated into a command for controlling the remote device.

Figure 11:
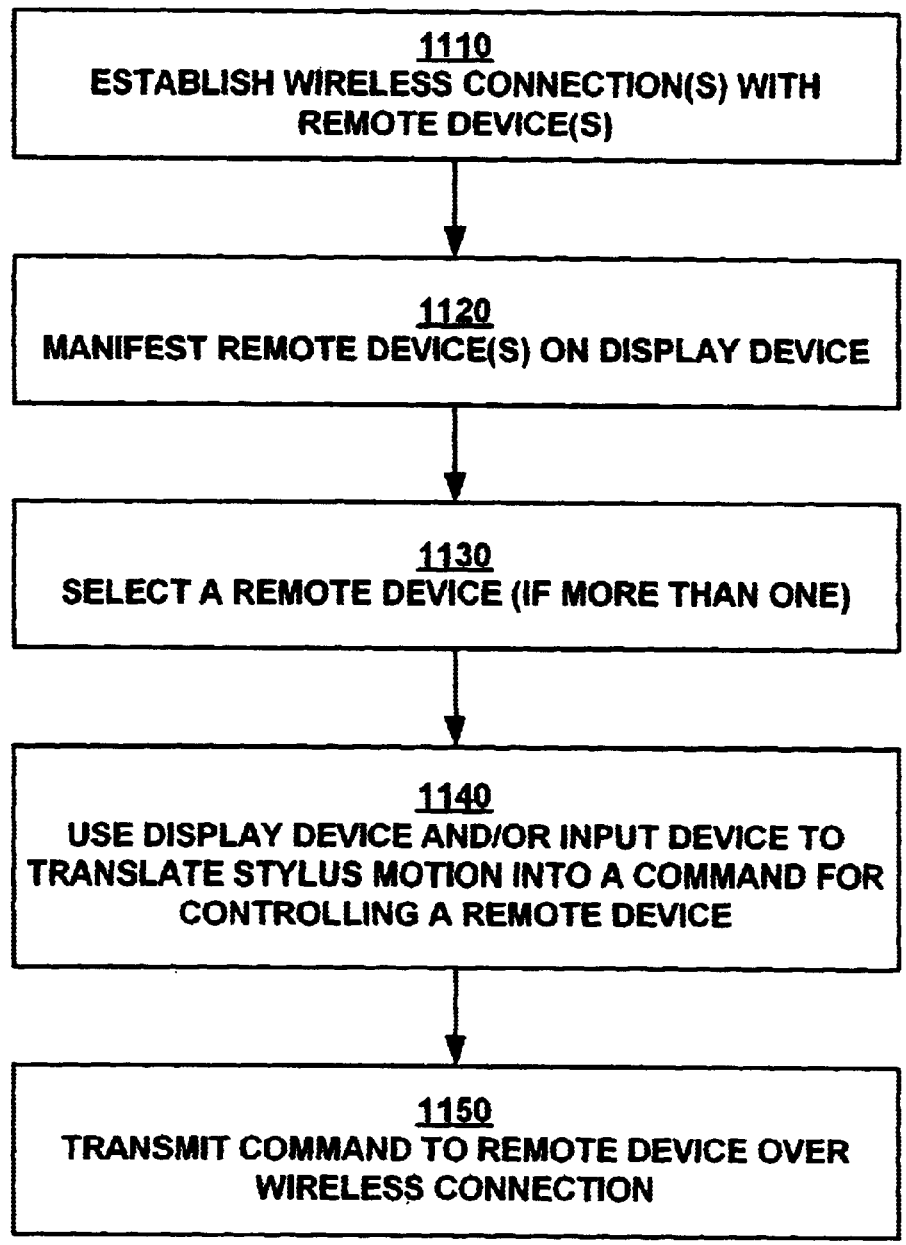
FIG. 11 is a flowchart of the steps in a process for controlling a remote device over a wireless connection in accordance with one embodiment of the present invention.

FIG. 11 is a flowchart of the steps in a process 1100 for controlling a remote device over a wireless connection in accordance with one embodiment of the present invention. In step 1110, a wireless connection is established between the controlling device (e.g., portable computer system 100 of FIG. 6) and a remote device or remote devices to be controlled (e.g., remote devices 610, 620 and 630 of FIG. 6). As described above, if the MAC addresses of remote devices 610–630 are known, then a page 506 (FIG. 5) is used by portable computer system 100; otherwise, an inquiry 504 (FIG. 5) is used. In response to the broadcast message, each of remote devices 610–630 sends a response to portable computer system 100. In the Bluetooth embodiment, the broadcast message and the responses are transmitted using radio signals.

In one embodiment, the characteristics and capabilities of remote devices 610–630 are identified in the response. In another embodiment, the characteristics and capabilities of various types of devices are stored in a database or lookup table in a memory unit of portable computer system 100. In this latter embodiment, the responses from the remote devices include an identifier that can be used by portable computer system 100 to retrieve the characteristics and capabilities of remote devices 610–630 from memory.

In step 1120 of FIG. 11, each of the remote devices (e.g., remote devices 610–630) responding to the broadcast message is manifested on portable computer system 100. In one embodiment, each remote device is indicated on display device 105 of portable computer system 100 (refer to FIG. 7). The characteristics and capabilities of each remote device 610–630 are linked to the indications (e.g., icons) on display device 105.

In step 1130, one of the remote devices 610–630 is selected by a user. In one embodiment, the user makes a selection by touching a stylus (e.g., stylus element 90 of FIG. 7) to the screen of display device 105. It is appreciated that, if only one remote device is present or if a response is received from only one remote device, then step 1130 may be bypassed.

In step 1140 of FIG. 11, as described above in conjunction with FIGS. 8, 9 and 10, a user can input a command for controlling any of remote devices 610–630 using display device 105 and/or input device 106. In various embodiments, display device 105 displays a rendering of the remote device, a rendering of a mechanism for controlling the remote device, or a menu of commands for controlling the remote device. In one embodiment, a user can use stylus element 90 to make contact with the surface of display device 105. The position where stylus element 90 contacts the surface of input device 105 is registered and translated into a particular command.

In another embodiment, a user can input a command using input device 106 and stylus element 90, by inscribing a command or by using a character or stroke that represents a command. In these cases, input device 106 registers the movement of the stylus and translates the movement into a particular command. In another embodiment, a user can impart motion to the rendering of the remote device displayed on display device 105 by moving stylus element 90 on input device 106. The motion of the stylus or the corresponding motion of the rendering can be translated into a command for controlling the remote device.

In step 1150 of FIG. 11, the command (e.g., command 660 of FIG. 6) is transmitted to the remote device. In accordance with the present invention, additional commands can also be sent to the remote device. In the Bluetooth embodiment, commands are transmitted via a radio signal.

In the case in which more than one remote device is to be controlled, another remote device can be selected as in step 1130, and commands can be input and transmitted to that device as described above. Furthermore, portable computer system 100 can be transported to a new location (e.g., another room), and process 1100 can be repeated to locate and identify compliant remote devices in the new location, establish connections with those devices, and specify and transmit commands for controlling those devices. The processing power and intelligence of portable computer system 100 in combination with the processing power and intelligence of each transceiver 108 (in both portable computer system 100 and in the remote device; refer to FIGS. 4A and 4B) permit portable computer system 100 to be updated as needed, so that it can operate as a universal remote control device for a multiplicity of different devices, including new devices.

Thus, the present invention provides a system and method that can be used to remotely control a variety of different devices. In one embodiment, the present invention provides a system (e.g., a Bluetooth-enabled device, specifically a portable computer system) that can be used to remotely control compliant devices (e.g., other Bluetooth-enabled devices) over a wireless (radio) connection. With a radio connection, the system of the present invention is not limited to line-of-sight applications. Remote devices can be adapted to receive commands over the wireless connection, obviating the need for hardwire connections and making the system relatively easy to implement in homes and businesses. The processing power and other features of the portable computer system enable user-friendly interfaces, and also allow a variety of remote devices to be controlled, including new devices introduced into the home or business.

The preferred embodiment of the present invention, portable device control console with wireless connection, is thus described. While the present invention has been described in particular embodiments, it should be appreciated that the present invention should not be construed as limited by such embodiments, but rather construed according to the following claims.

What is claimed is:

1. A method for controlling a remote devices over a wireless connection, said method comprising:
   a) establishing said wireless connection between a transceiver and said remote device by:
      broadcasting a message, said message for locating remote devices within range of said transceiver; and
      receiving a response from said remote device;
   b) manifesting said remote device on a display device;
   c) registering a position where contact is made with a surface of an input device, wherein a particular position on said input device is translated into a particular command for controlling said remote device; and
   d) transmitting a command to said remote device over said wireless connection.

2. The method as recited in claim 1 wherein said step c) comprises the step of:
   registering a position where a stylus element makes contact with said surface of said input device.

3. The method as recited in claim 2 wherein said step c) further comprises the step of:
   recognizing a movement of said stylus element over said surface of said input device, wherein a particular movement of said stylus element is translated into a particular command for controlling said remote device.

4. The method as recited in claim 2 further comprising the step of:
   registering a position where said stylus element makes contact with a screen of said display device, wherein a particular position on said screen is translated into a particular command for controlling said remote device.

5. The method as recited in claim 1 further comprising the steps of:
   receiving responses from a plurality of remote devices;
   manifesting each of said plurality of remote devices on said display device; and
   selecting one of said plurality of remote devices.

6. The method as recited in claim 1 further comprising the step of:
   displaying on said display device a rendering of a mechanism for controlling said remote device.

7. The method as recited in claim 6 further comprising the step of:
   contacting a particular position in said rendering, wherein said contacting is translated into a particular command corresponding to said particular position.

8. The method as recited in claim 6 further comprising the step of:
   imparting motion to said rendering in response to movement of a stylus element over said surface of said input device.

9. The method as recited in claim 1 further comprising the steps of:
   displaying on said display device a menu of commands for controlling said remote device; and
   contacting a particular position in said menu, wherein said contacting is translated into a particular command corresponding to said particular position.

10. The method as recited in claim 1 wherein said transceiver and said remote device are Bluetooth-enabled devices.

11. A computer system comprising:

a bus;

a processor coupled to said bus;

a transceiver coupled to said bus;

a display device coupled to said bus; and an input device coupled to said bus;

said processor for performing a method for controlling a remote device over a wireless connection, said method comprising the computer-implemented steps of:
  a) establishing said wireless connection between said transceiver and said remote device by:
    broadcasting a message, said message for locating remote devices within range of said transceiver; and
    receiving a response from said remote device;
  b) manifesting said remote device on a display device;
  c) registering a position where contact is made with a surface of an input device, wherein a particular position on said input device is translated into a particular command for controlling said remote device; and
  d) transmitting a command to said remote device over said wireless connection.

12. The computer system of claim 11 wherein said step c) of said method comprises the step of:
  registering a position where a stylus element makes contact with said surface of said input device.

13. The computer system of claim 12 wherein said step c) of said method further comprises the step of:
  recognizing a movement of said stylus element over said surface of said input device, wherein a particular movement of said stylus element is translated into a particular command for controlling said remote device.

14. The computer system of claim 12 wherein said method further comprises the steps of:
  registering a position where said stylus element makes contact with a screen of said display device, wherein a particular position on said screen is translated into a particular command for controlling said remote device.

15. The computer system of claim 11 wherein said method further comprises the steps of:
  receiving responses from a plurality of remote devices;
  manifesting each of said plurality of remote devices on said display device; and
  selecting one of said plurality of remote devices.

16. The computer system of claim 11 further comprising the step of:
  displaying on said display device a rendering of a mechanism for controlling said remote device.

17. The computer system of claim 16 wherein said method further comprises the step of:
  contacting a particular position in said rendering, wherein said contacting is translated into a particular command corresponding to said particular position.

18. The computer system of claim 16 wherein said method further comprises the step of:
  imparting motion to said rendering in response to movement of a stylus element over said surface of said input device.

19. The computer system of claim 11 wherein said method further comprises the steps of:
  displaying on said display device a menu of commands for controlling said remote device; and
  contacting a particular position in said menu, wherein said contacting is translated into a particular command corresponding to said particular position.

20. The computer system of claim 11 wherein said transceiver and said remote device are Bluetooth-enabled devices.

21. A hand-held computer system for controlling a remote device over a radio connection, said system comprising:

a bus;

a processor coupled to said bus;

a transceiver coupled to said bus, said transceiver for transmitting commands for controlling said remote device over said radio connection, wherein said transceiver is adapted to broadcast a message for locating remote devices within range of said transceiver, wherein each remote device responding to said message is indicated on said display device;

a display device coupled to said bus, said display device adapted to register a position where a stylus element makes contact with a screen of said display device, wherein a particular position on said screen is translated into a particular command for controlling said remote device; and an input device coupled to said bus, said input device adapted to register a position where a stylus element makes contact with a surface of said input device, wherein a particular position on said input device is translated into a particular command for controlling Said remote device.

22. The computer system of claim 21 wherein said input device is adapted to recognize a movement of said stylus element over said surface of said input device, wherein a particular movement of said stylus element is translated into a particular command for controlling said remote device.

23. The computer system of claim 21 wherein said transceiver and said remote device are Bluetooth-enabled devices.

24. The computer system of claim 21 wherein said display device is adapted to display a rendering of a mechanism for controlling said remote device.

25. The computer system of claim 24 wherein said display device is adapted to register a position where said stylus element makes contact within said rendering, wherein a particular position within said rendering is translated into a particular command for controlling said remote device.

26. The computer system of claim 24 wherein said display device is adapted to impart motion to said rendering in response to movement of said stylus element over said surface of said input device.

27. The computer system of claim 21 wherein said display device is adapted to display a menu of commands for controlling said remote device.

* * * * *